March 4, 1930.  R. J. MINSHALL  1,749,438
SHOCK ABSORBING LANDING HOOK
Filed Sept. 12, 1928
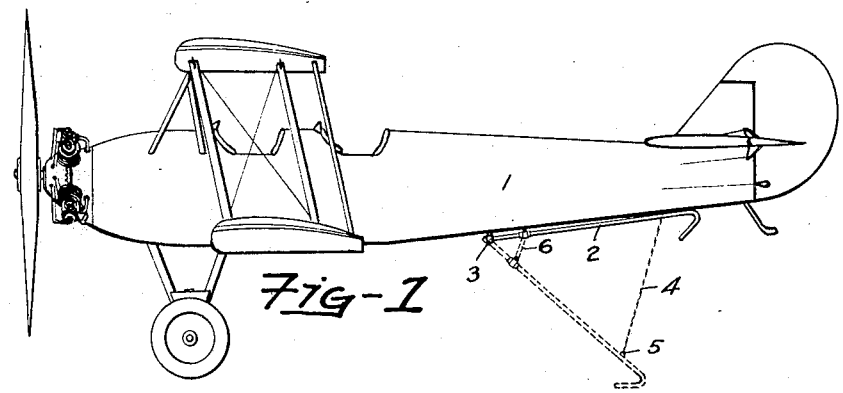
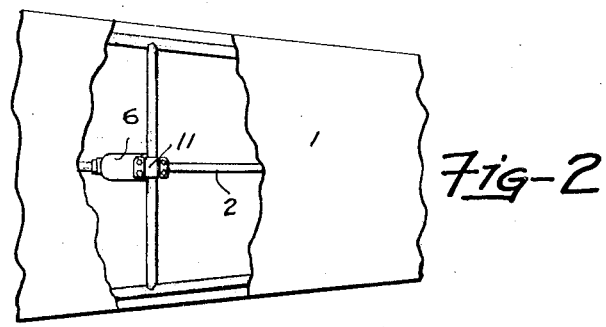
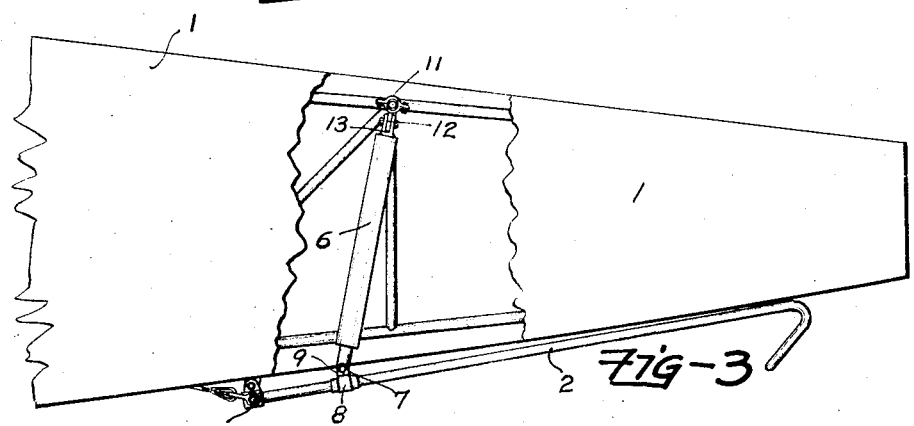
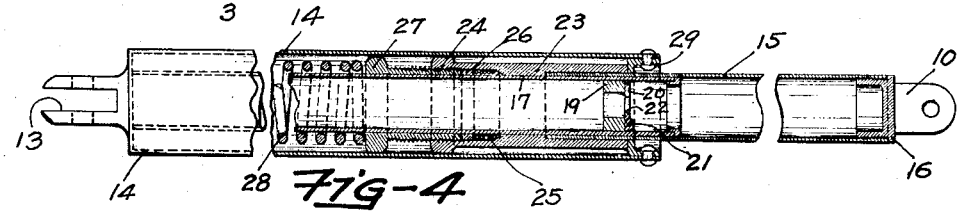
INVENTOR
Robert J. Minshall

Patented Mar. 4, 1930

1,749,438

UNITED STATES PATENT OFFICE

ROBERT J. MINSHALL, OF SEATTLE, WASHINGTON, ASSIGNOR TO BOEING AIRPLANE COMPANY, OF SEATTLE, WASHINGTON

SHOCK-ABSORBING LANDING HOOK

Application filed September 12, 1928. Serial No. 305,530.

This invention relates to improvements in landing hooks for aircraft, and has for its principal object to provide a shock absorbing means in combination with any approved form of the usual type of landing hook for preventing the hook from bouncing upwardly when striking the landing area and passing over the arresting gear without engagement therewith. This shock absorbing means also forms a limit stop for the upward swing of the hook and thus prevents the hook from striking and damaging the structural elements of the lower side of the fuselage These and other objects will appear as my invention is more fully hereinafter described in the following specification, illustrated in the accompanying drawings and finally pointed out in the appended claims.

In the drawings:

Figure 1, is a side elevation of an airplane showing any approved type of landing hook with my improved type of shock absorber in operative engagement therewith. Also showing the landing hook (in dotted lines) in a lowered position preparatory to engagement with the arresting gear (not shown in the drawings).

Figure 2, is a fragmentary plan view of the fuselage or airplane body with a portion broken away.

Figure 3, is a fragmentary side elevation of the fuselage, showing the landing hook and shock absorbing means in their normal positions, or rather inoperative positions.

Figure 4, is a longitudinal sectional detail view of the shock absorbing means.

Referring now more particularly to the drawings:

Reference numeral 1 indicates the fuselage of an airplane, the bottom of which is provided with any approved type of landing hook swingably and pivotally mounted thereto by means of the customary universal connection, generally indicated at 3. A retrieving cable 4 is secured to the hook as at 5, and extends over a pulley or the like within the fuselage, thence forward to a point within convenient reach of the pilot for manually drawing the hook upwardly into its full line position, as shown in Figure 1.

The shock absorbing unit, generally indicated at 6, and located as shown in Figure 3, has one of its ends hingedly secured to the hook as at 7, by any suitable means such for instance as a collar 8, and clevis 9, to receive the lugged end 10. Its opposite end is swingably mounted to a cross member in the fuselage by means of a collar 11 and lug 12 adapted to be swingably bolted to the bifurcated end 13.

The shock absorbing unit comprises a hollow cylindrical main body member indicated at 14, and as previously stated formed with a bifurcated end 13. Mounted within the cylinder 14 is a hollow tubular member 15, the outermost end of which is plugged with a cap 16, formed as previously stated, with a lug 10. The inner end of the tubular member 15 slidably embraces a hollow tubular member 17, the end of which is provided with a reinforcing ring 18. Near this same end of the tube 17 is an internal annular supporting collar 19 rigidly secured within the tube and forming a support and valve seat for a flapper valve 20. The valve being swingably mounted to the collar 19 as at 21. 22 indicates an aperture in the valve which it will be noted is considerably less in diameter than the bore of the collar 19. The opposite end of the tube 17 is made integral with, and sealed by the inner end of the cylinder 14 by any suitable means.

The inner end of the tubular member 15 is securely fastened to a cylindrical member 23 which is internally recessed and threaded as at 24 to receive packing 25, packing ring 26, and packing nut 27. 28 indicates a coil spring having one of its ends bearing against the nut 27 and the opposite end against the end wall of the cylinder 14.

The opposite end of the cylinder 14 is provided with an internal ring 29 riveted in place as shown which forms a limit stop for the downward or outward movement of the tube 15 and its related parts.

The tubular member 15 is filled with sufficient oil to keep the collar 19 and the valve 20 submerged at all times.

The operation of the device is as follows:

Assuming for illustration that the airplane is approaching the landing area. The pilot releases the retrieving cable 4 which causes the hook to be quickly forced downwardly into its dotted line position, in readiness of engagement with the arresting gear. The downward thrust of the hook is caused by the action of the coil spring 28 bearing against the packing unit, which as previously stated is made integral with the tubular member 15. During the downward stroke the oil is quickly flushed through the collar 19 into the tubular member 15, the valve 20 having swung from its seat with the rush of oil. Of course on the opposite or upward movement of the tubular member 15, with the valve 20 closed, the oil will be slowly forced through the small aperture in the valve thus preventing a sudden rebound of the hook. Therefore an airplane equipped with this improved form of hook arranged for instantaneous positioning for operative engagement with the arresting gear, and yieldingly mounted for wiping contact with parts of the arresting gear not intended for engagement, an accurate and safe landing is assured. Heretofore it has been quite common for landing hooks in striking the landing area to rebound with sufficient force to damage the underside of the fuselage, then before resuming its operative position the airplane would be clear of the arresting gear.

While I have shown a particular form of embodiment of my invention I am aware that many minor changes therein will readily suggest themselves to others skilled in the art without departing from the spirit and scope of the invention.

Having thus described the invention, what I claim as new and desire to protect by Letters Patent is:—

1. An arresting mechanism of the class described consisting of a hook the shank of which is pivotally and swingably mounted to the underside of an airplane fuselage, a fluid actuated double acting shock absorbing and dampening means interposed between said hook shank and said fuselage adapted to retard the upward movement of the hook toward the fuselage and to accelerate its opposite or downward movement.

2. An arresting mechanism of the class described consisting of a hook the shank of which is pivotally and swingably mounted to the underside of an airplane fuselage, a fluid actuated double acting shock absorbing and dampening means interconnecting said hook shank and said fuselage adapted to retard the movement of the hook in one direction and to accelerate its movement in the opposite direction.

3. An arresting mechanism of the class described consisting of a hook the shank of which is pivotally and swingably mounted to the underside of an airplane fuselage, a fluid actuated double acting shock absorbing means yieldingly connecting said hook shank with said fuselage.

4. An arresting mechanism of the class described consisting of a hook the shank of which is pivotally and swingably mounted to the underside of an airplane fuselage, a double acting fluid actuated shock absorbing means yieldingly connecting said hook shank with said fuselage.

5. An arresting mechanism of the class described consisting of a hook the shank of which is pivotally and swingably mounted to the underside of an airplane fuselage, a rapid extending and slow compressing fluid actuated shock absorbing means yieldingly connecting said hook shank with said fuselage.

6. An arresting mechanism of the class described consisting of a hook the shank of which is pivotally and swingably mounted to the underside of the airplane fuselage, a shock absorbing means yieldingly connecting said hook shank with said fuselage, said shock absorbing means consisting of a tube slidably mounted within a tube and one of said tubes forming a fluid reservoir, a valve for regulating the flow of said fluid from one tube to the other, and a compression spring arranged to normally extend the tubes.

In testimony whereof I affix my signature.

ROBERT J. MINSHALL.